United States Patent [19]

Kaneko et al.

[11] Patent Number: 5,299,850
[45] Date of Patent: Apr. 5, 1994

[54] AUTOMOBILE WITH CANVAS

[75] Inventors: Takashi Kaneko; Tatsuo Suzuki; Yoshihisa Inoue; Tetsuya Kato, all of Hamamatsu, Japan

[73] Assignees: Suzuki Motor Corporation; Ohta Sheet Company, both of Shizuoko, Japan

[21] Appl. No.: 936,932

[22] Filed: Aug. 27, 1992

[30] Foreign Application Priority Data

| Aug. 28, 1991 | [JP] | Japan | 3-242566 |
| Aug. 28, 1991 | [JP] | Japan | 3-242567 |
| Aug. 28, 1991 | [JP] | Japan | 3-242568 |
| Aug. 28, 1991 | [JP] | Japan | 3-242569 |

[51] Int. Cl.$^5$ .............................. B60J 7/08
[52] U.S. Cl. .............................. 296/107; 296/146.14; 296/219
[58] Field of Search .............. 296/107, 219, 146 L

[56] References Cited

U.S. PATENT DOCUMENTS

| 4,850,634 | 7/1989 | Taubitz | 296/107 |
| 4,898,420 | 2/1990 | Takada | 296/219 |

FOREIGN PATENT DOCUMENTS

| 2927068 | 2/1980 | Fed. Rep. of Germany | 296/107 |
| 33114 | 8/1928 | France | 296/219 |
| 2661140 | 10/1991 | France | 296/107 |
| 78811 | 4/1988 | Japan | 296/107 |
| 192633 | 8/1988 | Japan | 296/107 |
| 943654 | 12/1963 | United Kingdom | 296/219 |

Primary Examiner—David M. Mitchell
Assistant Examiner—Gary C. Hoge
Attorney, Agent, or Firm—McGlew and Tuttle

[57] ABSTRACT

An automobile is provided with canvas top elements. The automobile includes a rear opening defined by a central pillar, rear body side portions and a rear body portion. A rear canvas rib is provided including a rear arch-shaped portion and a front arch-shaped portion. The front arch-shaped portion has lower end portions which are link-coupled with lower end portions of the arch-shaped rear frame. The lower end portions of the rear frame are disposed slidably along a longitudinal direction of the car body along guide rails provided in the rear side portions of the car body. The canvas rib is folded downwardly as the lower end portions of the arch-shaped rear frame slide in a forward longitudinal direction and the frame is folded upwardly to outstretch the canvas.

10 Claims, 16 Drawing Sheets

AUTOMOBILE WITH CANVAS

FIELD OF THE INVENTION AND RELATED ART STATEMENT

The present invention relates to an automobile with a canvas top, and more particularly to an automobile with a canvas top in which a canvas rib can be housed without removing the canvas from the roof, and the canvas covering a roof of front seats and the canvas covering rear seats can also be opened independently.

Conventionally, in an automobile with a canvas top in which a portion of the roof above the driver's seat side and a portion of the roof above the rear seats are cut open, and the opened portion is covered by a canvas, the roof above the driver's seat and the portion above the rear seats have been covered en bloc with one canvas.

FIG. 27 and FIG. 28 show an automobile with a canvas top of this sort.

An automobile with a canvas top 100 is provided with front seats 102 where a driver's seat 101 is installed in a front part of a car body, and with rear seats 104 covered by a canvas top 103 in a rear part thereof.

An opening portion 106 is provided on a roof 105 of the front seats 102, and this opening portion 106 is covered en bloc with the canvas top 103. The front portion of the canvas top 103 covering this opening portion 106 is provided so that it may be opened by an opening and closing mechanism 107 provided on both sides of the opening portion 106. The opening and closing mechanism 107 is composed of rotary arms 108 on both sides and canvas top fixing plate 109 provided between respective tips of these rotary arms 108, and a tip portion of the canvas 103 is fixed by hooking hooks 111 sewed at certain spaces at the tip of the canvas top 103 at engagement holes 110 provided at certain spaces on the back of the canvas top fixing plate 109.

On the other hand, the canvas top 103 covering the rear seats 104 is outstretched by a top bow frame 113 provided in a car body 112. The top bow frame 113 is supported by the car body 112 at both lower end portions thereof and provided while stretching toward the upper rear obliquely, and the inside of the canvas top 103 is held by hooks so as to apply tension to the canvas top 103.

When the canvas top 103 is folded up, the hooks 111 provided at the tip of the canvas 103 are removed from the canvas fixing plate 109 so as to bring down the top bow frame 113, and the canvas 103 is removed from the top bow frame 113, thereby to open the roof 105 and an upper space of the rear seats 104.

Then, the removed canvas 103 is folded up and housed in the car body 112.

When the upper space of the rear seats 104 is opened, however, the opening portion 106 of the roof 105 has also to be opened, and it was impossible to remove the canvas 103 from above the rear seats 104 only. Further, since it is impossible to fold up the top bow frame 113 with the canvas 103 attached, the canvas 103 had to be always removed when the top bow frame 113 is folded up. Further, there has been such a problem that, when the roof 105 above the front seats is half-opened, the canvas is loosened and the canvas portion above the rear seats 104 flutters.

Further, since it is difficult to fold up the canvas 103 in case there is a side window in folding up the canvas 103, it has been arranged to make the side window removable, or to use a canvas with no side window.

Further, in such an automobile with a canvas top conventionally, L-shaped frames 115 are installed from a rear face of a center pillar 114 along the rear part of the car body 112 and this portions on both sides of the canvas 103 are wound around these frames 115 in order to apply sealing between the car body 112 and the canvas 103 as shown in FIG. 29 and FIG. 30. As a result, sealing is applied between the canvas 103 and a weather strip 116 disposed on the rear face of the center pillar 114 on the side of the canvas 103 (Japan Patent Provisional Publication No. 1-293223).

On both sides of the canvas 103, however, sealing is applied by bringing the weather strip 116 into contact with the canvas 103 on both sides of the canvas 103. Therefore, there has been such a fear that rain sifts into the cabin through a chink because of a wind at time of travelling.

OBJECT AND SUMMARY OF THE INVENTION

It is an object of the present invention to provide an automobile with a canvas top in which a canvas rib can be folded up with a canvas attached and the canvas above rear seats can also be detached independently of a roof above front seats.

Further, it is another object of the present invention to provide an automobile with a canvas top in which a canvas to part of a roof above the front seats can be fully opened or half-opened independently of a canvas top covering the rear seats and sufficient tension can also be applied to the canvas.

Furthermore, it is still another object of the present invention to provide an automobile with a canvas top in which a canvas rib can be folded up with a canvas attached and folding is also possible without producing a crease on a side window.

Further, it is another object of the present invention to provide an automobile with a canvas top in which a canvas rib can be folded up with a canvas attached, a canvas covering rear seats can be detached independently of a roof above front seats, and it is possible to improve sealing performance between a car body and the canvas.

In order to achieve the above-mentioned objects, the present invention is possessed of a structure as follows.

According to the invention, an automobile is provided with a canvas top in which at least an upper part of the rear seats is opened and this opened portion is covered with a canvas, an arch-shaped front frame and rear frame axially supported rotatably at lower end portions are link-coupled with each other on both sides of a rear car body and the lower end portions of the rear frame are disposed slidably along a longitudinal direction of the car body, thereby to construct a canvas rib. The above-mentioned front frame and rear frame of this canvas rib are unfolded upward so as to outstretch the canvas and these front frame and rear frame are brought down rearward, thereby to fold up the canvas.

The canvas rib is preferably composed of an arch-shaped front frame axially supported rotatably at the lower end portions thereof on sides of a car body and in which the lower end side of the axially supported portion is bent rearward. An arch-shaped rear frame is link-coupled at lower end portions thereof through links, respectively, at the rear end portions of the front frame. Guide rails are provided in a longitudinal direction of a car body for guiding rollers axially supported at the lower end portions of the rear frame. A support link mechanism is provided on the rear portion side of the rear frame for controlling the movement of the rear frame, wherein the canvas rib is folded up by bringing down the rear frame rearward while moving the rollers axially supported at the lower end portions of the rear frame toward the front frame side along the guide rails.

The support link mechanism is composed of links axially supported at two points of the rear frame and a link with these links axially supported at one end portion side respectively and axially supported by the car body at the other portion side.

According to a further aspect of the invention, an automobile with a canvas top is provided in which a roof above front seats and the upper part of rear seats are opened and this opened portions are covered with a canvas. The canvas is split into a front canvas at a roof portion above front seats and a rear canvas of a rear seat portion. A supporting frame is provided on which the front canvas is installed dispose-detachably on the circumference of the opening portion of the canvas installed disposed above the rear seats. Almost the first half portion of the supporting frame is formed rotatably and the first half portion of the front canvas is formed so that it may be opened.

The supporting frame is composed of a movable frame on the front side coupled mutually through hinges on both sides of an opening portion above front seats and a stationary frame on the rear portion side. The movable frame is composed of a canvas fixing plate on the back side of which engagement holes are formed at certain spaces and two arms are provided for supporting both sides of this canvas fixing plate. Engagement portions are provided at the tip portion of the front canvas and are engaged with engagement holes of the canvas fixing plate so as to support the tip portion of the front canvas detachably.

The canvas rib of the rear canvas is composed of an arch-shaped front frame axially supported rotatably at both lower end portions thereof on sides of a car body and in which the lower portion side of this axially supported portion is bent rearward. An arch-shaped rear frame is link-coupled with the rear end portions of the front frame through links, respectively. Guide rails are provided in a longitudinal direction of a car body for guiding rollers axially supported at the lower nd portions of this rear frame. A support link mechanism is provided on the rear portion side of the rear frame for controlling the movement of the rear frame. The rear canvas is fitted detachably to the above-mentioned front frame and rear frame and the upside of the rear car body. The above-mentioned front frame and rear frame are rotated so as to assume an erect posture at time of unfolding the rear canvas, thereby to outstretch the rear canvas. The above-mentioned front frame and rear frame are brought down rearward by rotating them and the rear frame is brought down rearward while moving rollers axially supported at the lower end portion of the rear frame toward the front frame side along the guide rails so as to fold up the canvas rib at time of housing the rear canvas.

The support link mechanism is composed of links axially supported at two points of the rear frame. These links are axially supported at one end portion side, respectively, and a link is axially supported to a car body at the other end portion side. The rear frame is prevented from sliding by means of the tension of the canvas and the above-mentioned support link mechanism at the time of outstretching the rear canvas.

The invention further provides an automobile with a canvas top in which the upper part of rear seats is opened and this opened portion is covered with a canvas. A folding-up type canvas rib is provided for outstretching a canvas by unfolding it and housing the canvas is provided on a rear car body portion. Side windows are provided on canvas sides attached to the canvas rib, and at least one side of these side window portions is constructed so as to be detachable from the canvas portion.

The upsides of the above-mentioned side windows are attached to a canvas through fasteners, and the canvas construction of the fastener portions is formed to have a double construction so that these fastener portions are concealed.

The canvas rib is composed of an arch-shaped front frame axially supported rotatably on sides of a car body at both lower end portions and in which a lower side of this axially supported portion is bent rearward. An arch-shaped rear frame is link-coupled with rear end portions of this front frame at lower nd portions through links, respectively. Guide rails are provided for guiding rollers axially supported at the lower end portions of this rear frame. A support link mechanism is provided on the rear side of the rear frame for controlling the movement of the rear frame. The canvas is fitted to the above-mentioned front, frame and rear frame and the upside of the rear car body. The above-mentioned front frame and rear frame are rotated so as to assume an erect posture, thereby to outstretch the canvas at a time of unfolding the canvas. One side of the side windows is broken away from the canvas portion. The front frame and the rear frame are rotated to be brought down rearward, and the rear frame is brought down rearward thereby to fold up the canvas rib while moving rollers axially supported at the lower end portions of the rear frame toward the front frame side along the guide rails at time of housing the canvas.

Further according to the invention, an automobile with a canvas top is provided in which the upper part of a car body on the rear side of a center pillar is opened, and the opened portion is covered with a canvas. A canvas rib for supporting the canvas is composed of an arch-shaped front frame axially supported by a car body at both lower end portions. An arch-shaped rear frame is link-coupled with this front frame at mutual lower end portions. Guide rails are provided in a longitudinal direction on both sides of a car body for supporting the lower end portions of the rear frame slidably in a longitudinal direction. A weather strip is disposed along the rear face of the center pillar and plate are provided abutting against the outer face of the weather strip when the canvas is outstretched on the front frame.

The canvas rib is composed of an arch-shaped front frame axially supported rotatably on sides of a car body at both lower end portions thereof and in which the lower side of this axially supported portion is bent rearward. An arch-shaped rear frame link-coupled with rear end portions of this front frame at lower end portions through links, respectively. Guide rails are provided in a longitudinal direction of the car body for guiding rollers axially supported at the lower end portions of this rear frame. A support link mechanism is provided on the rear side of the rear frame for controlling the movement of the rear frame. The canvas is fitted detachably to the above-mentioned front frame and rear frame and the upside of the rear car body. The above-mentioned front frame and rear frame are rotated so as to assume an erect posture, thereby to outstretch the canvas when the canvas is outstretched, and the above-mentioned front frame and rear frame are rotated so as to be brought down rearward, and the rear frame is brought down rearward while moving rollers axially supported at the lower end portions of the rear frame toward the front frame side along the guide rails, thereby to fold up the canvas rib when the canvas is housed.

The operation of the present invention is as described hereunder.

The canvas for covering the opening portion of the roof above the front seats and the canvas for covering the upper part of the rear seats are installed individually. The front canvas is brought into a half-opened state by rotating the movable frame, and a fully-opened state is presented when the front canvas is detached from the supporting frame.

The rear canvas is outstretched between the front frame and the rear frame. When the front frame is set up and fixed to the rear face of the center pillar, the plate portion of the front frame abuts against the outer face of the weather strip thereby to apply sealing. At this time, the rear frame also rotates and stretches out obliquely to the upper rear, thus applying tension to the canvas.

When the rear canvas is folded up, the side windows are pulled out of the canvas body after removing fasteners and the like of the side windows. Then, when the front frame is brought down rearward, the rear frame also falls down rear-ward. The rear frame falls down rearward while the guide rollers move along the guide rails and the whole rear frame is moving frontward. Since the hard side window portions have been pulled out of the canvas body at this time, the canvas body is folded up thin. Thus, it is possible to fold up the canvas rib without removing the canvas from the front frame and the rear frame.

According to an automobile with a canvas of the present invention, it is possible to fold up the canvas rib without removing the rear canvas. Since the rear frame slides backward and forward, the canvas rib will never jump out of the car body.

In this case, housing of the canvas body is easy since the side windows have been pulled out of the canvas body.

Further, since a weather strip is disposed on the rear face of the center pillar, and plates abutting against this weather strip are provided on the front frame, a sufficient seal construction is obtainable.

On the other hand, according to the present invention, the front canvas can be removed without removing the rear canvas, and the rear canvas is not loosened even in case the front canvas is half-opened. Therefore, it is possible to prevent generation of fluttering and invasion of water from occurring. Furthermore, since a supporting frame is disposed around the front canvas, it is possible to obtain sufficient tension on the canvas and also to aim at improvement of water-proof performance and reduction of a sound of cutting through the air. Further, since the canvas is split into the front canvas and the rear canvas, it is possible to aim at a reduction of cost caused by exchange.

BRIEF DESCRIPTION OF THE DRAWINGS

FIG. 12($a$) and 12($b$) show a center pillar portion, wherein FIG. 12(a) is a sectional view taken along a line D—D in FIG. 8 and FIG. 12(b) is a sectional view taken along a line E—E in FIG. 8;

DETAILED DESCRIPTION OF PREFERRED EMBODIMENTS

An embodiment of the present invention will be described in detail hereinafter while referring to the accompanying drawings.

Figure 8:
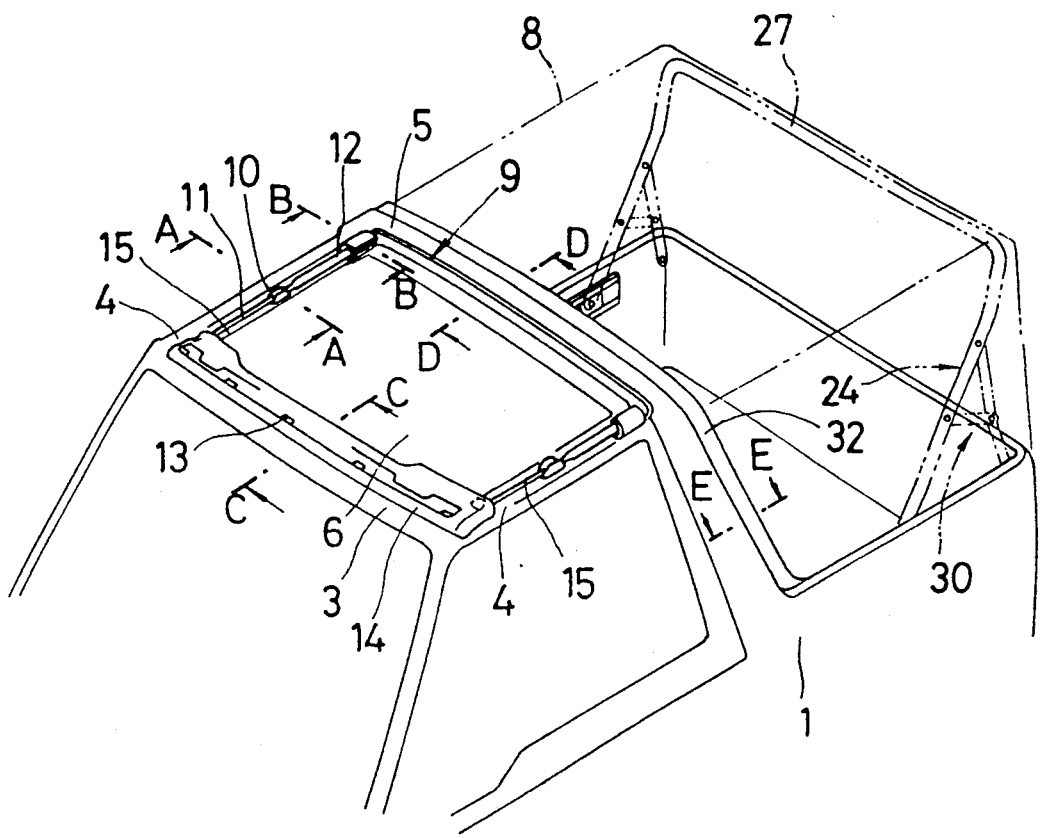
FIG. 8 is a perspective view showing a car body construction in a state that the canvas has been removed.

In FIG. 1 to FIGS. 12($a$) and ($b$), a reference numeral 1 represents a car body of an automobile with a canvas. An opening portion 6 surrounded by a front roof rail 3, side body panels 4, 4 and a center pillar 5 is provided on a roof 2 above front seats as shown in FIG. 8, and the opening portion 6 is covered with a front canvas 7. Reference numeral 6a represents a weather strip disposed on a fringe of the opening portion 6. On the other hand, the upper part of the rear of the center pillar 5 where rear seats are provided is opened, and this upper space is covered with a rear canvas 8.

Figure 9:
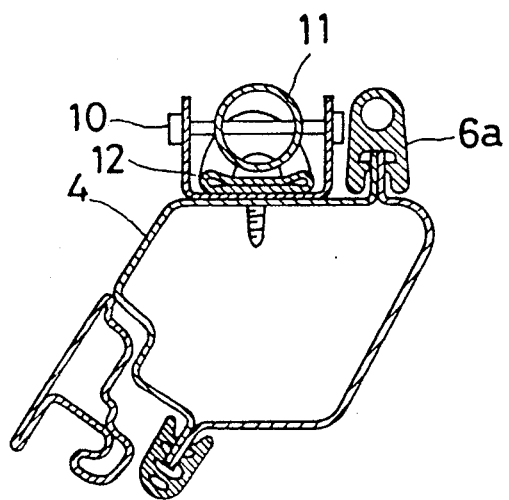
FIG. 9 is a sectional view taken along a line A—A in FIG. 8.

The front canvas 7 is installed on a supporting frame 9 disposed along a fringe of the opening portion 6. This supporting frame 9 is composed of a movable frame 11 on the front side and a stationary frame 12 on the rear side coupled through hinges 10 provided on both sides of the opening portion 6 as shown in FIG. 9.

Figure 10:
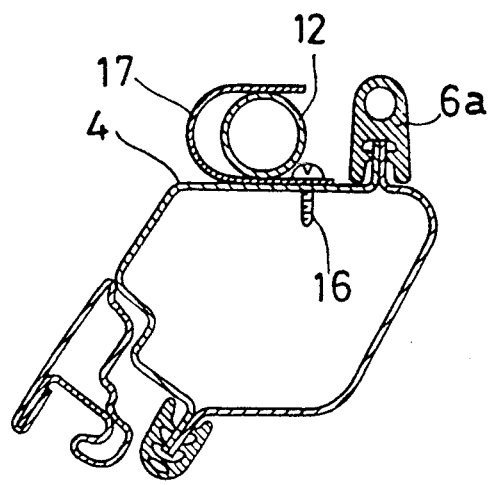
FIG. 10 is a sectional view taken along a line B—B in FIG. 8.
Figure 11:
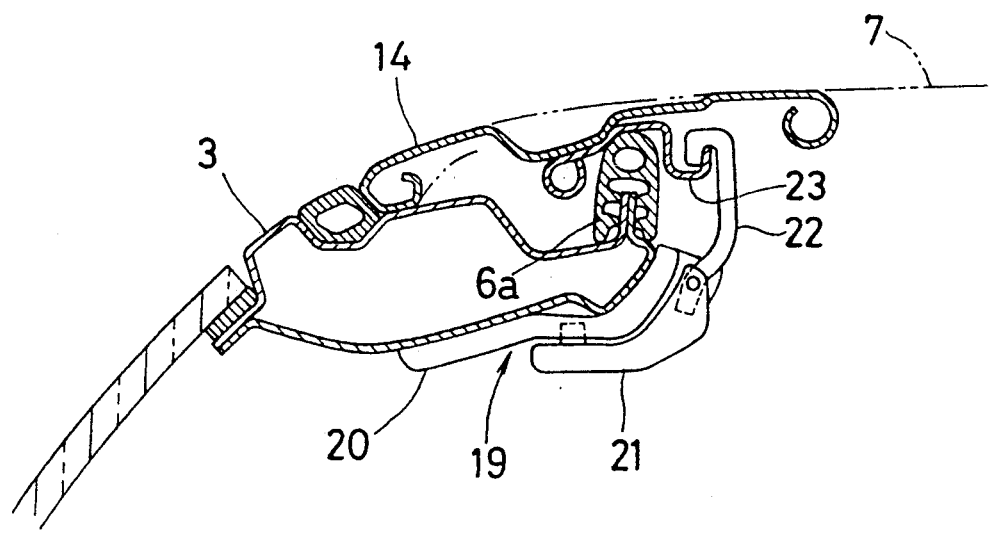
FIG. 11 is a sectional view taken along a line C—C in FIG. 8.
Figure 12:
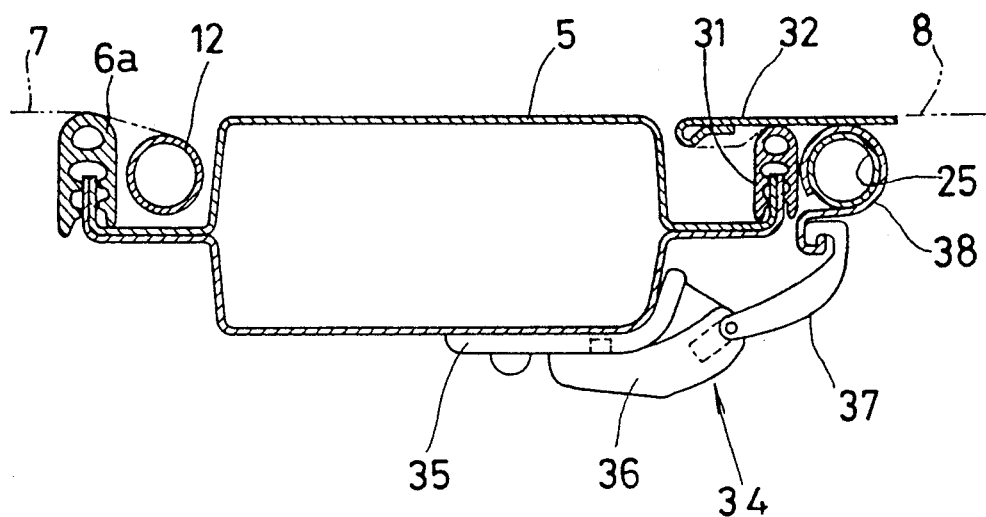
Figure 12:
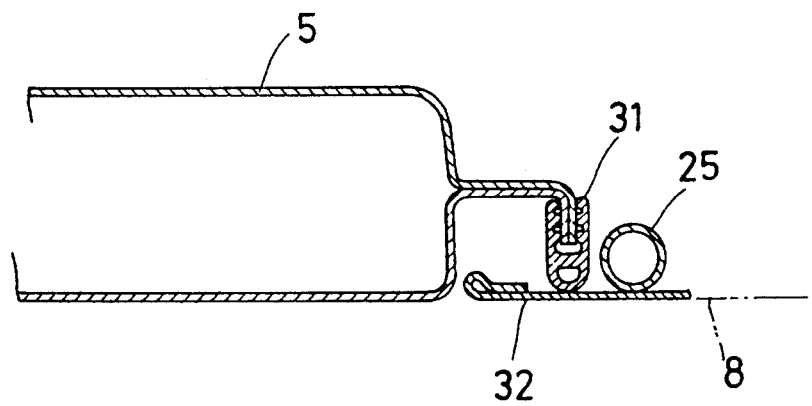

The movable frame 11 is composed of a canvas fixing plate 14 with engagement holes 13 formed at certain spaces on the back thereof and two arms 15 supporting this canvas fixing plate 14. The stationary frame 12 is fixed by means of a bracket 17 fixed to the side body panel 4 through a screw 16 as shown in FIG. 10.

Figure 4:
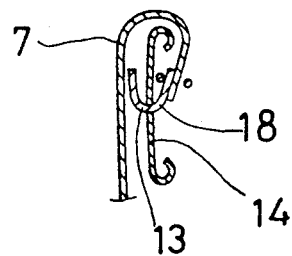
FIG. 4 is a sectional view taken along a line A—A in FIG. 3.
Figure 5:
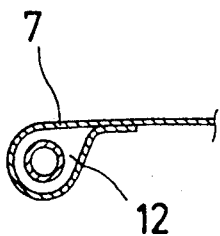
FIG. 5 is a sectional view taken along a line B—B in FIG. 3.
Figure 6:
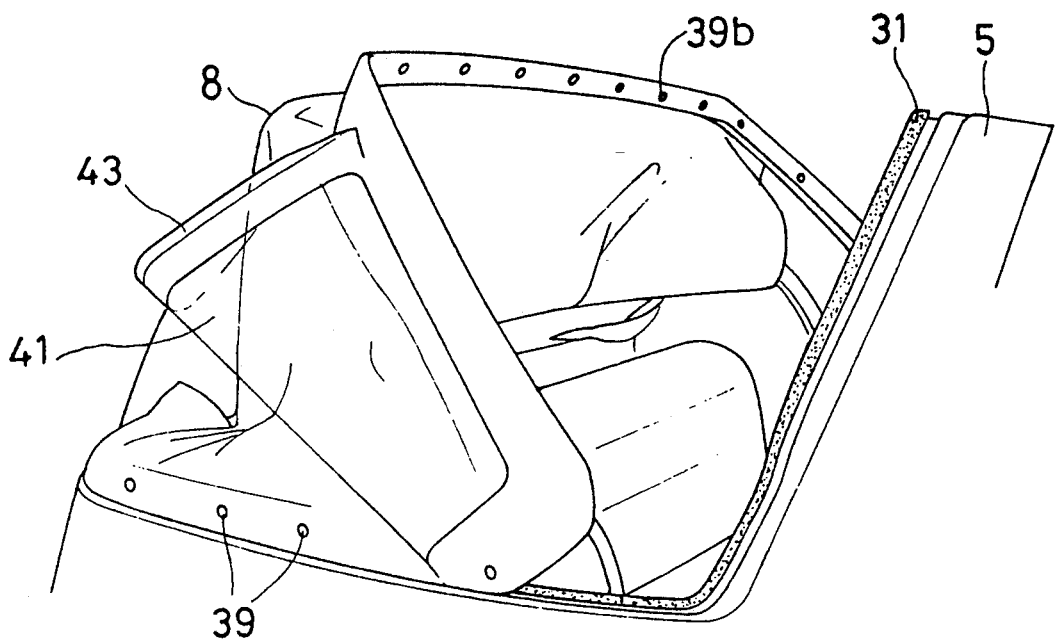
FIG. 6 is a perspective view showing a rear canvas.
Figure 7:
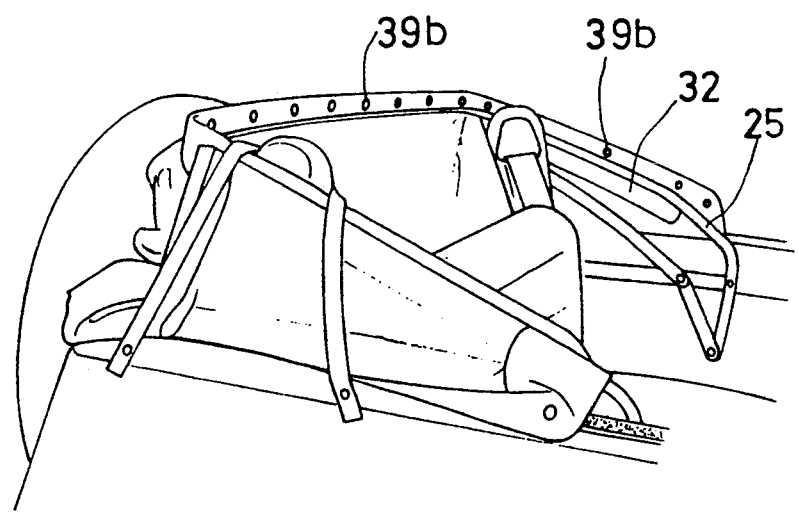
FIG. 7 is a perspective view showing a state before housing the rear canvas.

The front canvas 7 is fixed to a canvas fixing plate 14 at the tip portion thereof by hooking hooks 18 made of synthetic resin sewed on the tip portion at certain spaces on engagement holes 13 as shown in FIG. 4, and is wound around the stationary frame 12 at the rear end portion as shown in FIG. 5, thus being installed through face fasteners (magic fasteners) and the like.

Figure 13:
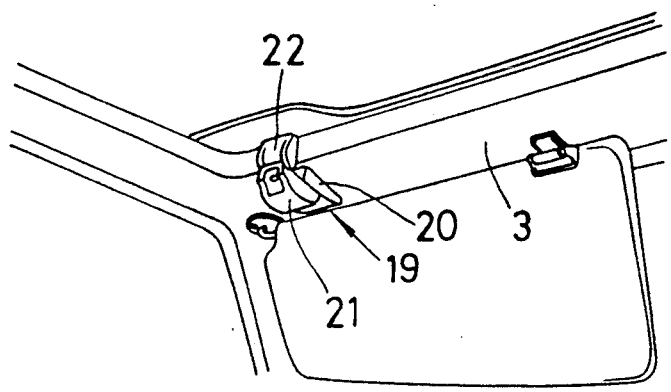
FIG. 13 is a perspective view showing a locking device of a front canvas.
Figure 14:
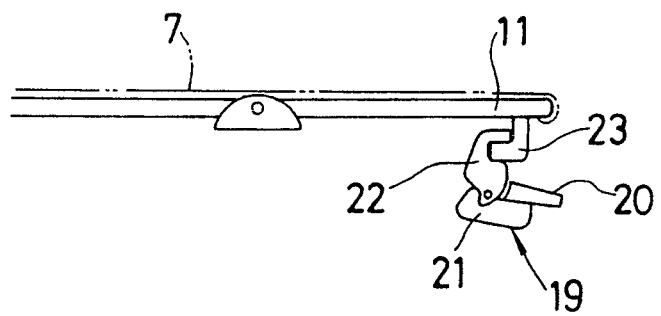
FIG. 14 is a conceptual view showing a locked state of a front canvas.
Figure 15:
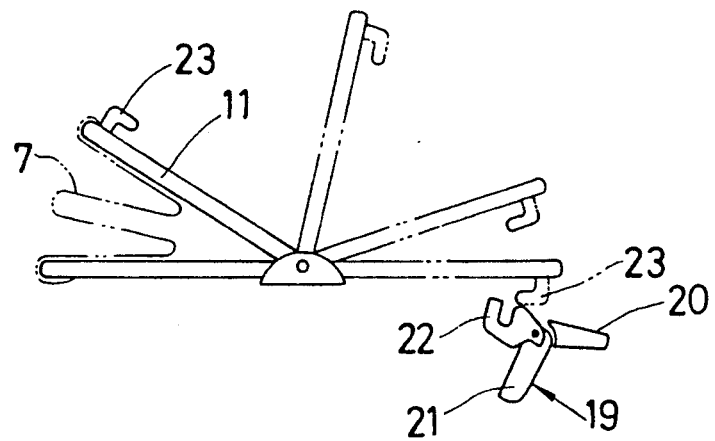
FIG. 15 is a conceptual view showing an opened state of a front canvas.

The movable frame 11 is fixed detachably by means of locking devices 19 provided left and right on the side of the cabin of the front roof rail 3. This locking device 19 is composed of a base 20 screwed on the side of the cabin of the front roof rail 3, a lever 21 axially supported by the base 20 and a hook 22 axially supported by this lever 21, and the movable frame 11 is fixed by hooking the hook 22 to a gaff portion 23 installed on the canvas fixing plate 14 and bringing the lever 21 down, and the movable frame 11 is enabled to be opened by disengaging the hook 22 from the gaff portion 23 (FIGS. 13-14).

The rear canvas 8 is incorporated in a canvas rib 24 assembled so as to be able to be folded up with respect to the car body 1.

Figure 16:
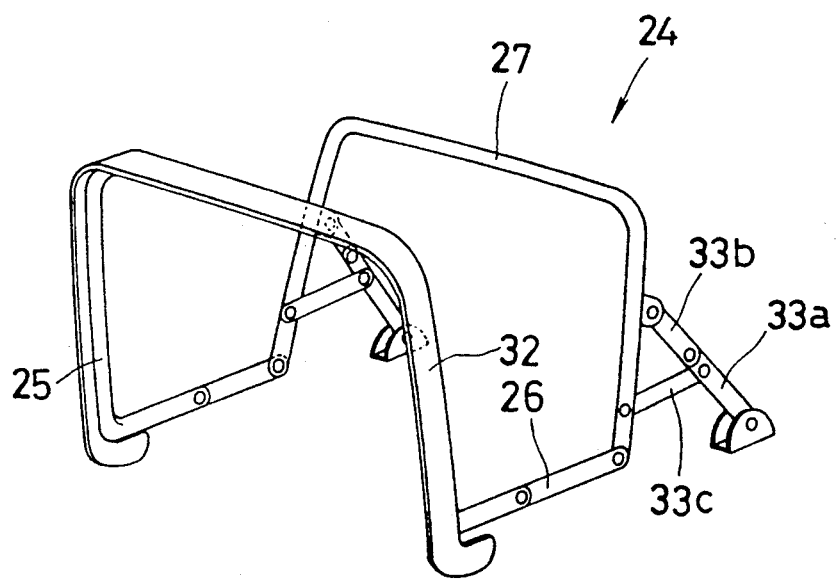
FIG. 16 is a perspective view showing canvas rib.
Figure 17:
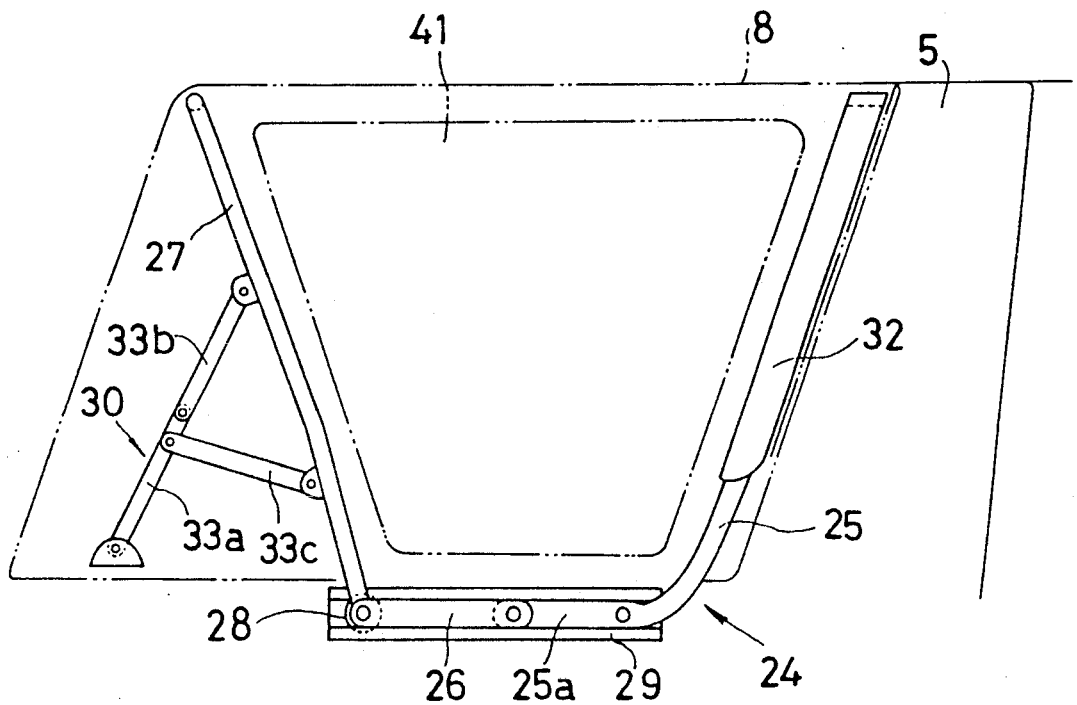
FIG. 17 is a conceptual view showing a canvas rib in an outstretched state of a rear canvas.
Figure 18:
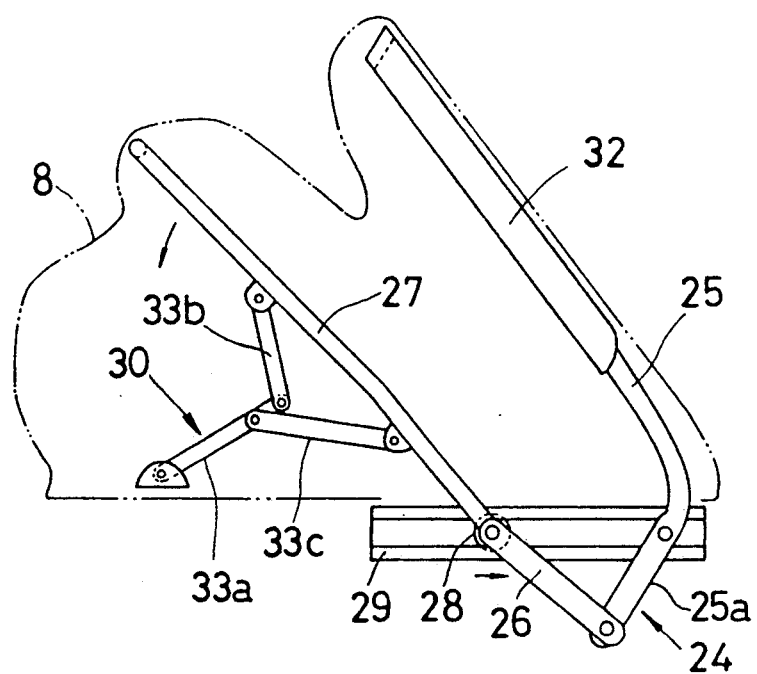
FIG. 18 is a conceptual view showing a canvas rib in a folding-up process of a front canvas.

This canvas rib 24 is constructed as shown in FIG. 16 to FIG. 18.

The canvas rib 24 is composed of an arch-shaped front frame 25 axially supported rotatably at the lower end portions on both sides of the car body 1 on the rear side, an arch-shaped rear frame 27 link-coupled through links 26 in the rear of the front frame 25, guide rails 29 provided in a longitudinal direction of the car body 1 for guiding rollers 28 axially supported at the lower end portions of the rear frame 27 and a support link mechanism 30 provided on the rear side of the rear frame 27 for controlling the movement of the rear frame 27.

The front frame 25 is formed along a rear face of the center pillar 5, and lower end portions 25a thereof are bent to form an L-shape plates 32 which abut against a weather strip 31 on the rear face of the center pillar 5 are attached by welding on the outside of the front frame 25.

The above-mentioned rear frame 27 stretches out obliquely rearward so as to form a V-shape with respect to the front frame 25. When the front frame 25 assumes an erect posture, the rollers 28 at the lower end portions move rearward through the links 26, and, when the front frame 25 comes down rearward, the rollers 28 at the lower end portions move frontward through the links 26.

The above-mentioned support link mechanism 30 is formed by coupling two points of the rear frame 27 and one point of the car body 1 together by means of three pieces of links 33a, 33b and 33c, and reinforces the rear frame 27 in a standing state.

Figure 19:
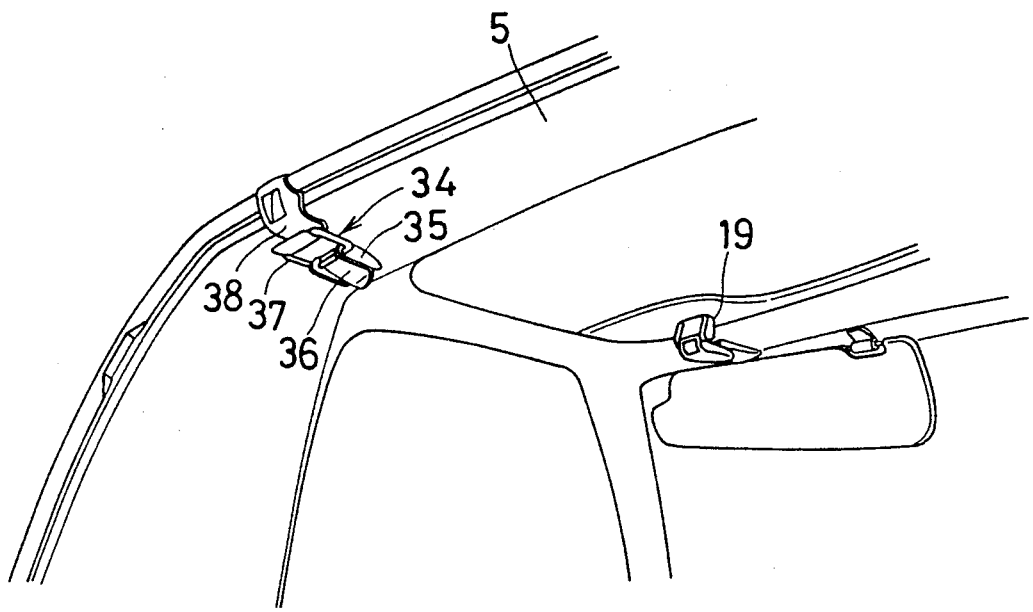
FIG. 19 is a perspective view showing a locking device of a rear canvas.

The above-mentioned front frame 25 is fixed to a locking device 34 provided on the side of the cabin of the center pillar 5. This locking device 34 is composed of a base 35 screwed to the center pillar 5, a lever 36 supported rotatably by the base 35, and a hook 37 supported by the lever 36 as shown in FIG. 19, and fixes the front frame 25 by hooking the hook 37 on a gaff section 38 fitted to the front frame 25 and bringing the lever 36 down.

Figure 20:
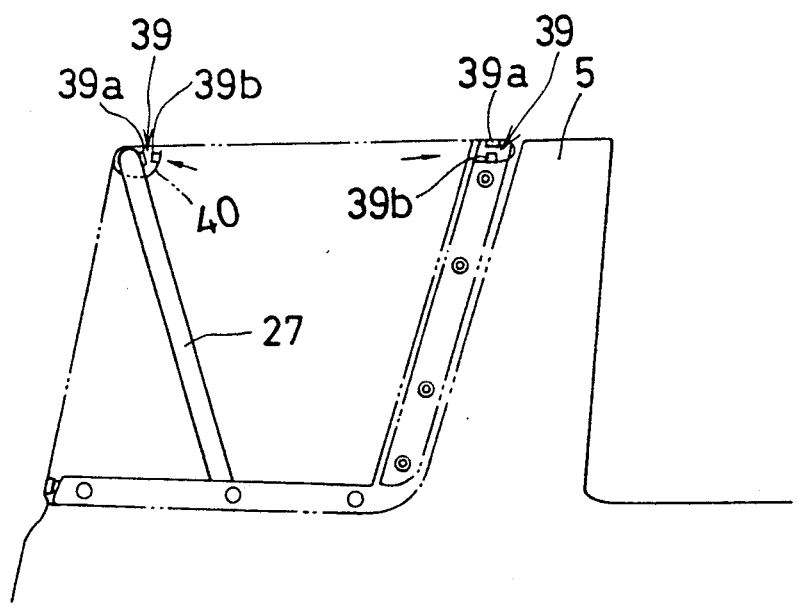
FIG. 20 is a conceptual view showing an assembly construction of a rear canvas and a canvas rib.
Figure 21:
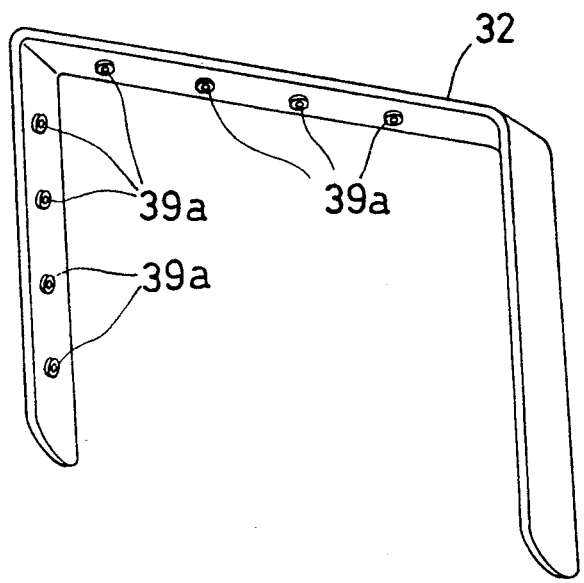
FIG. 21 is a perspective view showing a plate of a front frame.
Figure 22:
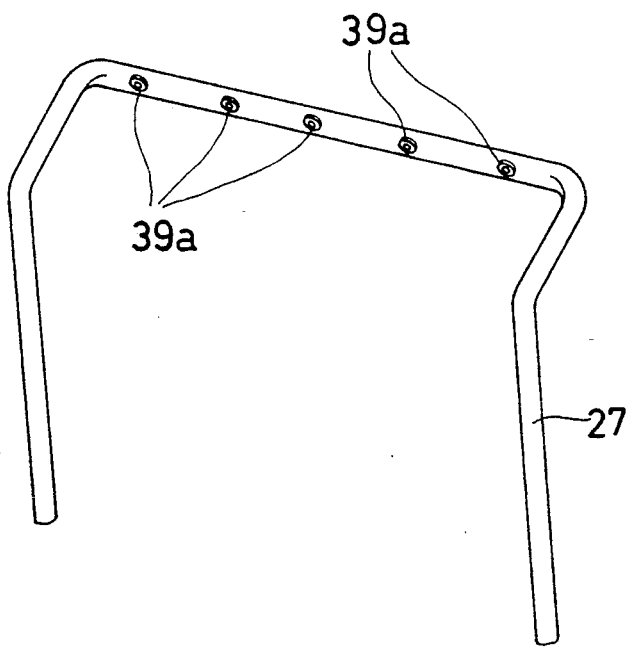
FIG. 22 is a perspective view showing a rear frame.

The rear canvas 8 is fitted to the canvas rib 24 in such a manner as shown in FIG. 20 to FIG. 22.

One side 39a of each snap hook 39 is attached at certain spaces on the front frame 25 and the rear frame 27 of the canvas rib 24. On the other hand, the other side 39b of each snap hook 39 is sewed inside the rear canvas 8 corresponding to the above. As to the snap hook 39 of the rear frame 27, opposing parts 39a and 39b of the snap hook 39 are fastened together by sewing the other side 39b of the snap hook 39 on a string 40 sewed on the inside of the rear canvas 8 and winding the string 40 around the rear frame 27.

Figure 1:
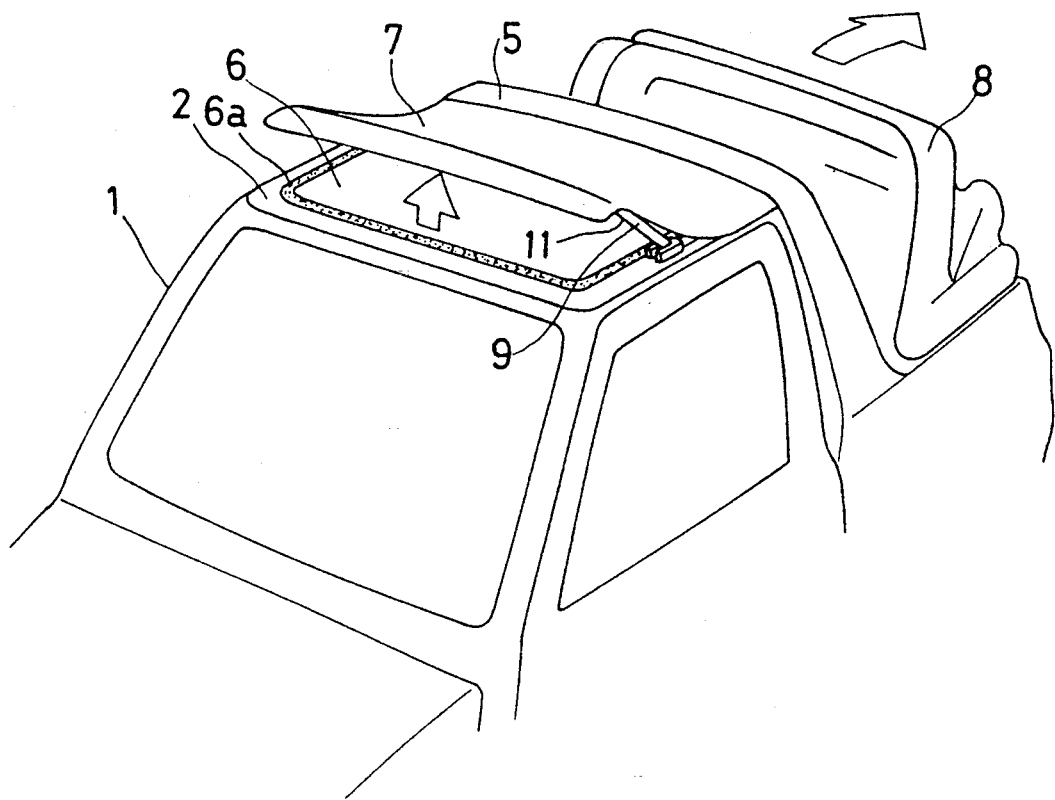
FIG. 1 is a perspective view showing an embodiment of an automobile with a canvas of the present invention.
Figure 2:
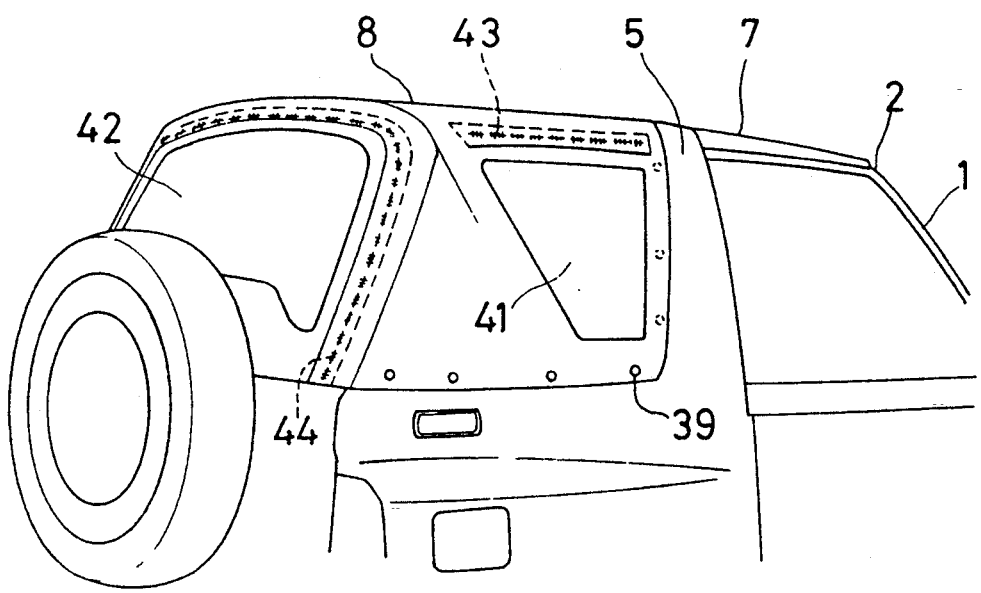
FIG. 2 is a perspective view when the automobile with a canvas is viewed from the rear.
Figure 3:
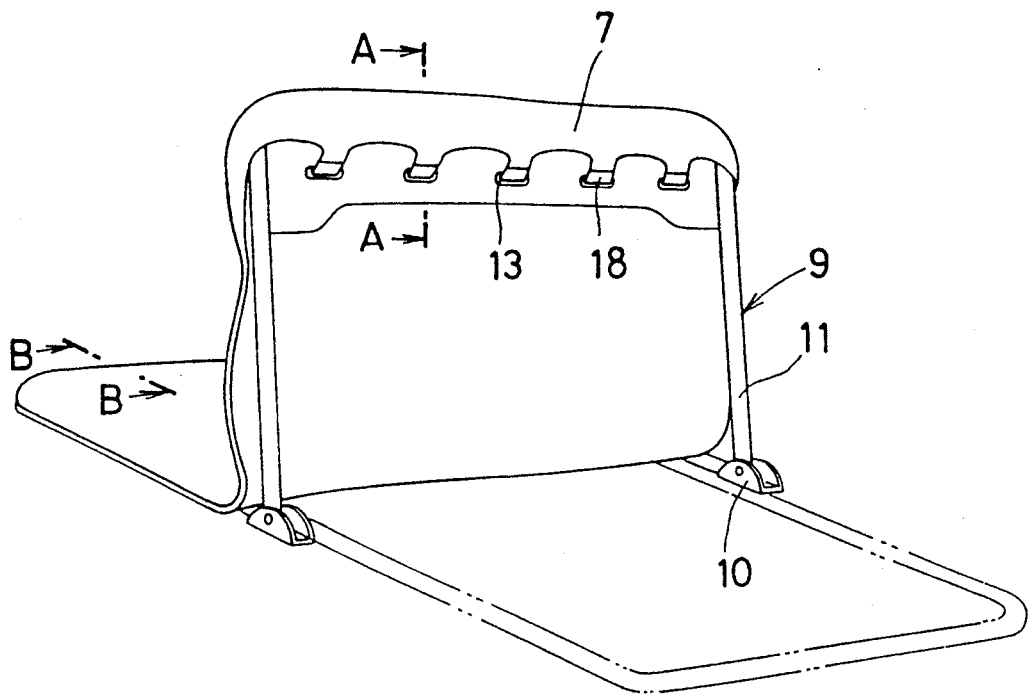
FIG. 3 is a perspective view showing a front canvas.
Figure 23:
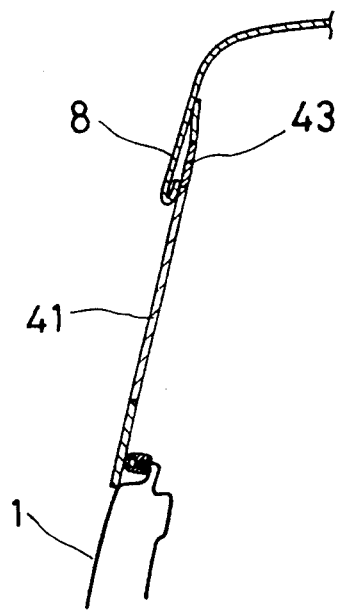
FIG. 23 is a sectional view of a side window provided on a rear canvas.

In the rear canvas 8, side windows 41 are provided on both sides thereof and a rear window 42 is provided on the rear side thereof as shown in FIG. 2. At the upside of the side windows 41, the canvas portion is formed to have a double construction, and a fastener 43 is attached on the inside portion thereof as shown in FIG. 23. Further, the canvas portion is also formed to have a double construction around the rear window 42 and a fastener 44 is attached on the inside portion, so that the rear window 42 portion is formed detachably.

Figure 24:
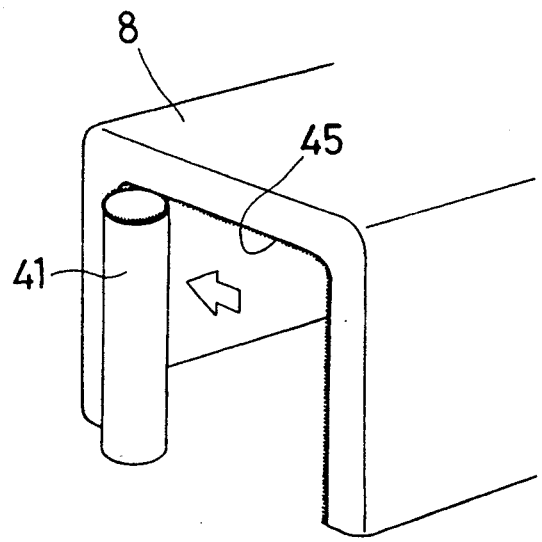
FIG. 24 is a conceptual perspective view showing another embodiment of a fitting construction of a side window.

Besides, it is possible to make the side window 41 removable by providing fasteners 45 along the whole periphery of the side window 41 as shown in FIG. 24.

In the next place, the operation of an automobile with a canvas of the present invention will be described.

In case the front canvas 7 is half-opened, the movable frame 11 is brought down rearward after undoing the hook 22 of the locking device 19. Thus, the opening portion 6 is brought into a half-opened state. The movable frame 11 is fixed to the stationary frame 12 or the center pillar 5 by a belt and the like.

Figure 25:
FIG. 25 is a conceptual view showing another embodiment of a canvas.
Figure 26:
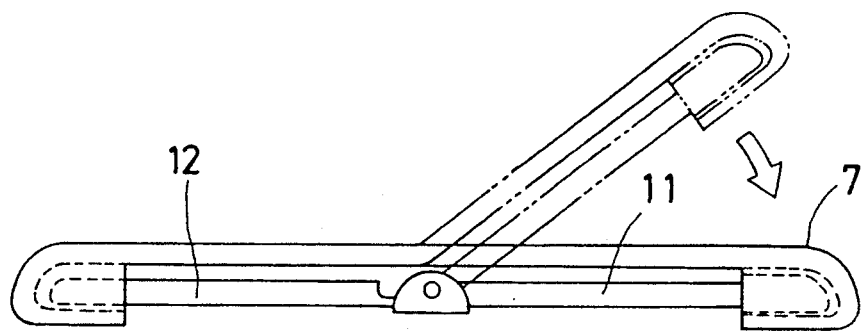
FIG. 26 is a conceptual view showing a state that a canvas is fitted to a supporting frame.
Figure 27:
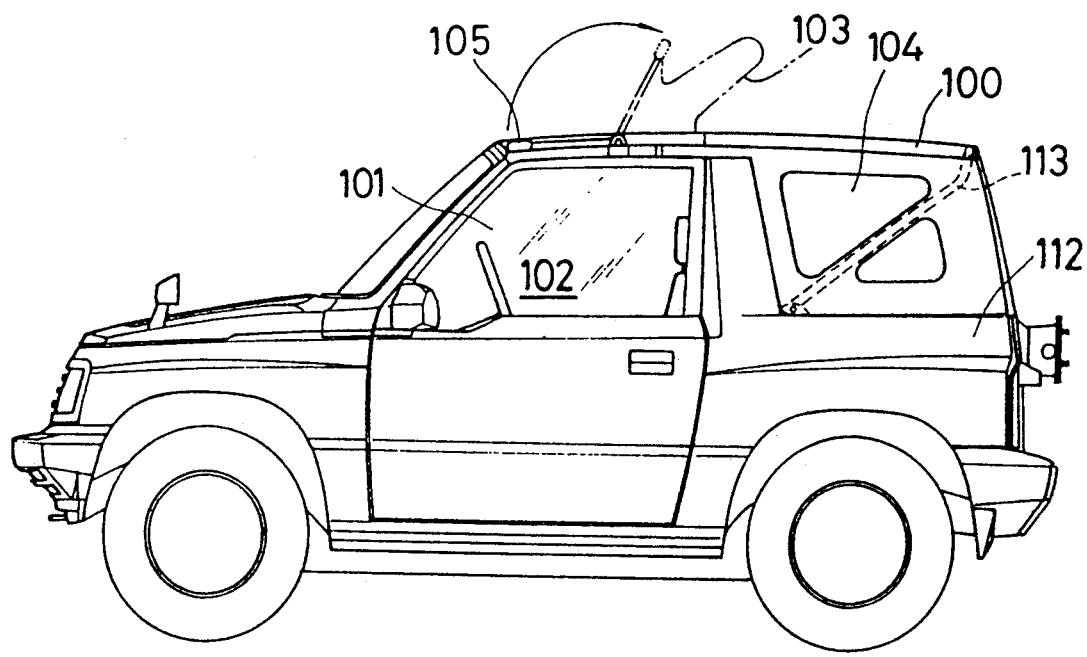
FIG. 27 is a conceptual view showing a conventional automobile with a canvas.
Figure 28:
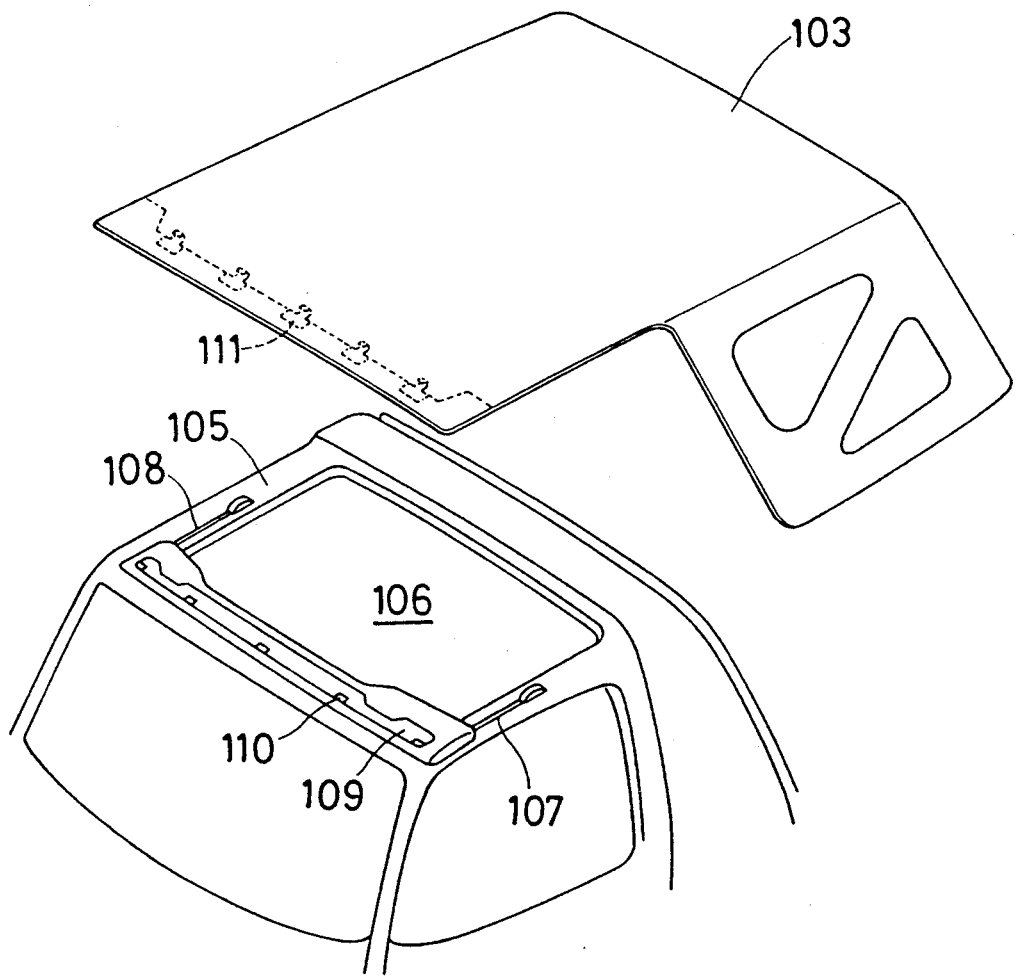
FIG. 28 is a perspective view showing a conventional canvas fitting construction.
Figure 29:
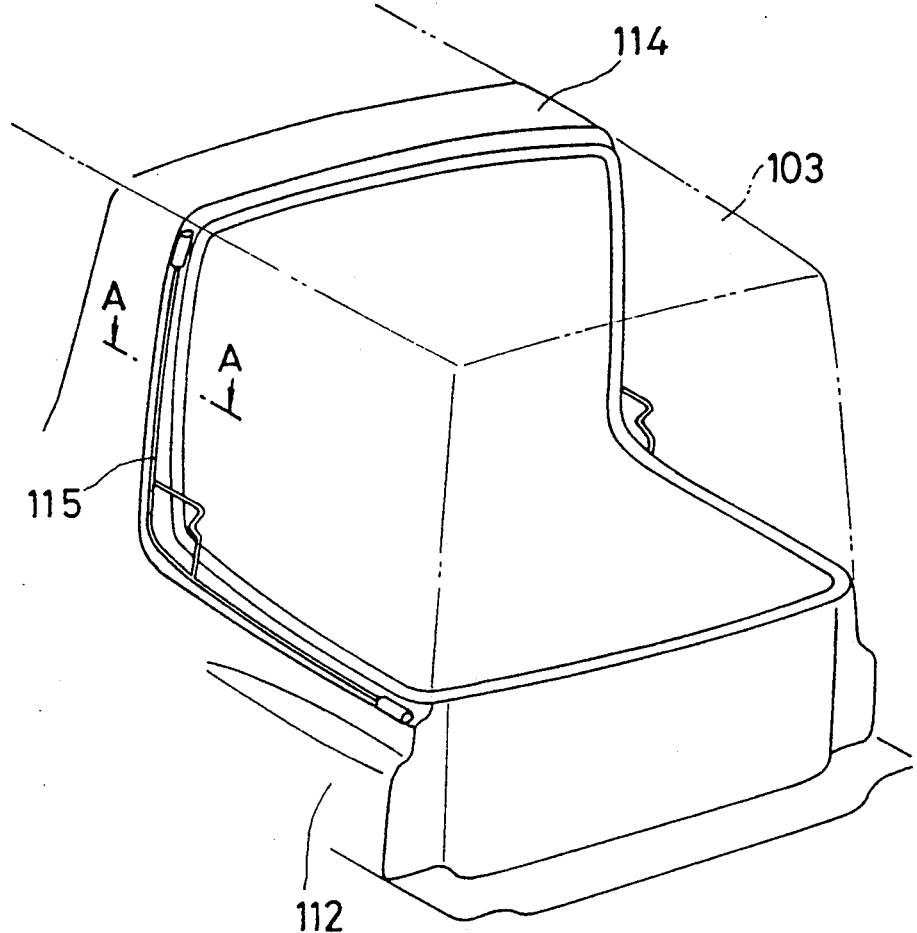
FIG. 29 is a conceptual perspective view showing a seal construction of a conventional automobile with a canvas.
Figure 30:
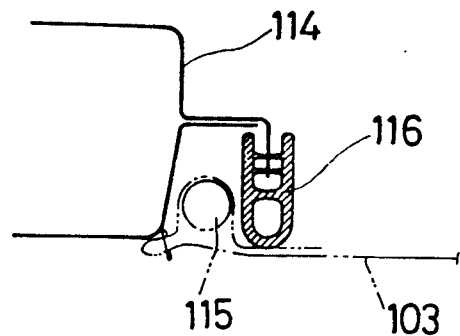
FIG. 30 is a sectional view taken along a line A—A in FIG. 29.

Next, in case the opening portion 6 is to be fully opened, this is done by removing the hooks 18 of the front canvas 7 from the canvas fixing plate 14 and removing the canvas 7 from the supporting frame 9. Besides, the front canvas 7 may be fitted by providing sack portions 7a and 7b at front and rear ends and covering these sack portions 7a and 7b on the movable frame 11 and the stationary frame 12 as shown in FIG. 25 and FIG. 26 in place of the hooks 22.

Next, when the rear canvas 8 is folded up, a hook 37 of the locking device 34 is removed from a gaff section 38 so as to bring down the front frame 25 rearward. At this time, the tension of the rear canvas 8 becomes loose by the rotation of the front frame 25, and the rear frame 27 falls down rearward while the rollers 28 are moving frontward along the guide rails 29. Thus, the rear frame 27 is folded up without jumping out of the rear end of the car body 1. At this time. folding-up of the rear canvas 8 is aided by removing the fasteners 43 and 44 of the side windows 41 and the rear windows 42.

When the rear canvas 8 is removed from the canvas rib 24 in case of exchange and the like, it is done by removing the snap hooks 39 from the plate 32 and the rear frame 27.

In case the rear canvas 8 is outstretched, when the front frame 25 is rotated so as to assume an erect posture, the rear frame 27 also assumes an erect posture following the above thereby to outstretch the rear canvas 8. Then, the canvas 8 is fixed by engaging the hook 37 of the locking device 34 on the gaff portion 38 of the front frame and bringing down the lever 36.

Since the plates 32 of the front frame 25 abuts against and is pushed against the external face of the weather strip 31 at this time, it is possible to maintain sufficient sealing performance.

The effects of the embodiment of an automobile with a canvas are as follows.

The canvas rib 24 is constructed by link-coupling the arch-shaped front frame 25 and the rear frame 27 axially supported rotatably at lower end portions on both sides of the rear car body and disposing the rear end portions of the rear frame 27 slidably along the longitudinal direction of the car body, and the above-mentioned front frame 25 and rear frame 27 of the canvas rib 24 are unfolded upward so as to outstretch the rear canvas 8 thereby to fold up the rear canvas 8 by bringing down these front frame 25 and rear frame 27 rearward, thus making it possible to fold up the canvas rib 24 without removing the rear canvas 8 from the canvas rib 24.

Further, since the rear frame 27 is disposed slidably at the lower end portions thereof along the longitudinal direction of the car body 1, the rear frame 27 will never jump out of the car body 1 when the canvas rib 24 is folded up.

The above-mentioned canvas rib 24 is composed of the arch-shaped front frame 25 axially supported rotatably on the sides of the car body 1 at both lower end portions thereof and in which the lower sides of these axially supported portions are bent rearward, the arch-shaped rear frame 27 link-coupled with the rear end portions of the front frame 25 at the lower end portions thereof through the links 26, respectively, the guide rails 29 provided in the longitudinal direction of the car body 1 for guiding the rollers 28 axially supported at the lower end portions of the rear frame 27, and the support link mechanism 30 provided on the rear side of the above-mentioned rear frame 27 for controlling the movement of the rear frame 27, wherein the canvas rib 24 is folded up by bringing down the rear frame 27 rearward while moving the rollers 28 axially supported at the lower end portions of the rear frame 27 toward the front frame 25 side along the guide rails 29. Thus, the rear frame is slided easily, and unfolding and housing of the canvas can be performed smoothly. Further, when the canvas is unfolded, a canvas construction having sufficient strength is obtainable because the movement of the rear frame 27 is controlled by means of the support link mechanism 30.

The above-mentioned support link mechanism 30 is composed of links 33b and 33c axially supported at two points of the rear frame 27, these links 33b and 33c being axially supported on one end portion side, respectively, and the link 33a axially supported by the car body 1 on the other end portion side. Thus, the rear frame is prevented from falling down frontward when the canvas rib is unfolded, and these links 33a, 33b and 33c are folded up and housed efficiently into the cabin when the canvas rib is housed.

The roof 2 above the front seats and the upper part of the rear seats are opened, the canvas covering these opened portions is split into the front canvas 7 for the roof 2 above the front seats and the rear canvas 8 for the rear seat portion, the supporting frame 9 installed detachably with the front canvas 7 is disposed along the fringe of the opening portion 6 of the roof 2 above the front seats, the canvas rib 24 installed with the rear canvas 8 is disposed above the rear seats, and almost the first half portion of the supporting frame 9 is formed rotatably and the first half portion of the front canvas 7 is formed so that it may be opened. Thus, it is possible to outstretch the front canvas and the rear canvas individually, or to house them individually.

The above-mentioned supporting frame 9 is composed of the movable frame 11 on the front side and the stationary frame 12 on the rear side coupled mutually through the hinges 10 on both sides of the opening portion 6 of the roof 2 above the front seats, the above-mentioned movable frame 11 is composed of the canvas fixing plate 14 with engagement holes 13 formed at certain spaces on the back thereof and two arms 15 supporting the both sides of this canvas fixing plate 14, and the hooks 18 as engagement portions provided at the tip portion of the front canvas 7 are engaged with engagement holes 13 of the canvas fixing plate so as to support the tip portion of the front canvas 7 detachably. Thus, it is possible to open and close the half of the front canvas 7.

Since the side windows 41 are provided on the canvas side faces installed on the canvas rib, and at least one side of these side windows 41 is formed detachable from the canvas portion, there is no fear that the side window is broken when the canvas is housed.

The upsides of the side windows 41 are attached to the rear canvas 8 through fasteners 43, and the canvas construction of these portions is formed to have a double construction so that the fastener 43 portions are concealed. Therefore, the fasteners 43 are invisible from the outside.

The canvas rib for supporting the rear canvas is composed of the arch-shaped front frame 25 axially supported by the car body at both lower end portions, the arch-shaped rear frame 27 link-coupled with the front frame 25 at the lower end portions thereof, and the guide rails 29 provided along the longitudinal direction on both sides of the car body 1 for supporting the lower end portions of the rear frame 27 slidably in the longitudinal direction, wherein the weather strip 31 is disposed along the rear face of the center pillar 5, and the plate portions 32 abutting against the external face of the weather strip 31 when the rear canvas 8 is outstretched are provided on the front frame 25, thus making it possible to obtain a sufficient sealing construction.

We claim:

1. An automobile with a removable top at an upper part adjacent to rear seats, the upper part being bounded by a car body center pillar, longitudinally extending side body portions, extending longitudinally from said center pillar and a rear body portion, comprising:

a canvas;

an arch-shaped front frame;

an arch-shaped rear frame having lower end portions, said arch-shaped front frame and said arch-shaped rear frame being link-coupled with each other on both sides of the automobile;

longitudinal support and guide means connected to the automobile and receiving said lower end portions of said rear frame for sliding said lower end portions of said rear frame along a longitudinal direction of the automobile for axially rotatably supporting said lower end portions whereby said arch-shaped front frame, said arch-rear frame and said link-coupling form a canvas rib with said canvas attached thereto whereby pivoting said canvas rib to an upper position unfolds said canvas and pivoting said canvas rib to a lower position folds said canvas.

2. An automobile with canvas top according to claim 1, further comprising:

a roof above front seats of the automobile being opened to provide an opened portion, a front canvas provided at said roof opened portion above said front seats, a supporting frame detachably connected on a circumference of said roof opened portion, and a front canvas connected to said supporting frame, a first half portion of said supporting frame being formed to pivot whereby said first half portion of said front canvas may be opened.

3. An automobile with canvas according to claim 1, wherein said arch-shaped front frame has lower end portions with a lower end side bent rearward, and link-coupling including links coupled to said lower end portions of said front frame, said supporting guide means including guide rails provided extending in the longitudinal direction of said car body, said lower end portion of said rear frame including guiding rollers engaging said guide rails; support link means positioned on a rear portion side of said rear frame and connected to the automobile for controlling movement of said rear frame, whereby pivoting said rear frame downwardly results in said rollers moving in said guide rails in a forward direction.

4. An automobile with a canvas top according to claim 3 wherein said support link means includes links axially supported at two points of said rear frame and having an opposite end portion side and an additional link connected to said end portion side and connected to the automobile.

5. An automobile with a removable top at an upper part adjacent to rear seats, the upper part being bounded by a car body front portion, longitudinally extending side body portions, extending longitudinally from said front portion and a rear body portion, comprising:

a canvas;

an arch-shaped front frame;

an arch-shaped rear frame having lower end portions said arch shaped front frame and said arch shaped rear frame being coupled with each other on both sides of the automobile by coupling means;

longitudinal support and guide means receiving said lower end portions of said rear frame for sliding said lower end portions of said rear frame along a longitudinal direction of the automobile for axially rotatably supporting said lower end portions whereby said arch-shaped front frame, said arch-rear frame and said coupling means form a canvas-rib with said canvas attached thereto whereby pivoting said canvas rib to an upper position unfolds said canvas and pivoting said canvas rib to a lower position folds said canvas;

side windows provided on canvas sides of said canvas; and connection and detachment means for connecting and detaching at least one of said side windows on said canvas.

6. An automobile with canvas top according to claim 5, further comprising:

a roof above front seats of the automobile being opened to provide an opened portion, a front canvas provided at said roof opened portion above said front seats, a supporting frame detachably connected on a circumference of said roof opened portion, and a front canvas connected to said supporting frame, a first half portion of said supporting fame being formed to pivot whereby said first half portion of said front canvas may be opened.

7. An automobile with a canvas top according to claim 5, wherein said side windows have an upside attached to said canvas through fasteners, said canvas having a double construction at said fasteners for concealing said fasteners.

8. An automobile according to claim 5, wherein said coupling means includes links connecting said arch-shaped rear frame end portions to said front frame lower end portions, said support and guide means includes guide rails connected to said car body; guiding rollers connected to said lower end portions of said rear frame and engaging said guide rails for moving said lower end portions in a longitudinal direction of said car body; and a support link mechanism provided on a rear side of said rear frame for controlling movement of said rear frame, said canvas being fitted to said front frame and said rear frame and a center pillar of said car body front portion to extend said canvas in an upper position of said canvas rib, at least one of said side windows being removed from said canvas for rotating said rear frame into a downward position to fold said canvas rib while moving said rollers axially in a forward direction.

9. An automobile with a removable top at an upper part adjacent to rear seats, the upper part being bounded by a car body center pillar, longitudinally extending side body portions, extending longitudinally from said center pillar and a rear body portion, comprising:

a canvas;

an arch-shaped front frame;

an arch-shaped rear frame having lower end portions, said arch-shaped front frame and said arch-shaped rear frame being link-coupled with each other on both sides of the automobile;

longitudinal support and guide means receiving said lower end portions of said rear frame for sliding said lower end portions of said rear frame along a longitudinal direction of the automobile for axially rotatably supporting said lower end portions whereby said arch-shaped front frame, said arch-rear frame and said link-coupling form a canvas rib with said canvas attached thereto whereby pivoting said canvas rib to an upper position unfolds said canvas and pivoting said canvas rib to a lower position folds said canvas, said support and guide means including guide rails connected to the automobile and extending in a longitudinal direction on each side of the automobile, said lower end portions of said rear frame being slidable in said guide rails in a longitudinal direction of said car body;

a weather strip disposed along a rear face of said center pillar; and plate portions provided on said front frame, said plate portions abutting against an outer face of said weather strip when said canvas is outstretched.

10. An automobile according to claim 9, wherein said lower side of said end portions of said frame is bent rearward; guiding rollers connected to said lower end portions of said rear frame and engaging said guide rails for moving said roller end portions in a longitudinal direction of said car body; and a support link mechanism provided on a rear side of said rear frame for controlling movement of said rear frame, said canvas being fitted to said front frame and said rear frame and said center pillar to extend said canvas in an upper position of said canvas rib.

* * * * *